Nov. 28, 1967    C. A. OPPEDAHL    3,355,126

RADIO BEAM CAPTURE CIRCUIT FOR AIRCRAFT GUIDANCE

Filed Sept. 6, 1966    3 Sheets-Sheet 1

INVENTOR
CHARLES A. OPPEDAHL
DECEASED
BY ROBERTA A. OPPEDAHL
ADMINISTRATOR
BY Moody & Anderson
AGENTS Nov. 28, 1967  C. A. OPPEDAHL  3,355,126
RADIO BEAM CAPTURE CIRCUIT FOR AIRCRAFT GUIDANCE
Filed Sept. 6, 1966  3 Sheets-Sheet 2

COURSE DATUM SYNCHRO OUTPUT

INVENTOR
CHARLES A. OPPEDAHL
DECEASED
BY ROBERTA A. OPPEDAHL
ADMINISTRATOR

BY *Moody & Anderson*
AGENTS

United States Patent Office 3,355,126
Patented Nov. 28, 1967

3,355,126
RADIO BEAM CAPTURE CIRCUIT FOR
AIRCRAFT GUIDANCE
Charles A. Oppedahl, deceased, late of Cedar Rapids, Iowa, by Roberta A. Oppedahl, administratrix, Cedar Rapids, Iowa, assignor to Collins Radio Company, Cedar Rapids, Iowa, a corporation of Iowa
Filed Sept. 6, 1966, Ser. No. 577,550
6 Claims. (Cl. 244—77)

This invention relates to an improved radio beam capture system for use in an autopilot. More specifically, the invention relates to a concept and implementation of capture logic by means of which an aircraft is caused to automatically "intercept" and track a particular radio defined course line.

In known flight control systems, the pilot may select a given course to an omnirange radio station and elect to fly a given "cut" at the selected course. At some predetermined magnitude of the radio error signal, the systems are caused to automatically trip over into a mode by which the aircraft is brought on to and tracked on the selected radio course. Radio error, as concerns omnirange systems, is an angular function, and thus the lateral off-course distance defined by a given error signal varies with the distance of the aircraft from the station. Current systems are known to switch to a tracking mode at some predetermined radio error threshold, and to effect an asymptotic flight path on to the selected course from the point at which the threshold is sensed. Thus, the "capture" of the radio beam is effected in a somewhat arbitrary manner.

The present invention provides a control system of an improved type by which a radio defined course may be "captured" in a more positive manner. The present invention takes into account distance from the radio station, aircraft velocity, and the angle at which the aircraft is taking a cut towards the selected radio course. The invention is thus featured in a system with a variable capture point in contradistinction with systems employing simply a fixed radio error threshold to effect capture.

The present invention is featured in the provision of a system which institutes radio beam capture at a time such that the aircraft may bank at its maximum bank angle and roll out onto the selected course with both the radio error zero and the heading error signal zero, so as to follow a circular flight path from the time of capture to the time of attaining the on-course condition where the aircraft ground track is coincident with the selected radio course line. The capture provision of the present invention is based on a trip point occurring at that point where the aircraft heading vector becomes tangent to a circle of radius R, where the radius R is an aerodynamic turning radius of the aircraft which corresponds to the aircraft velocity and the aircraft bank angle.

These and other objects and features of the present invention will become apparent upon reading the following description in conjunction with the accompanying drawings in which.

Figure 1:
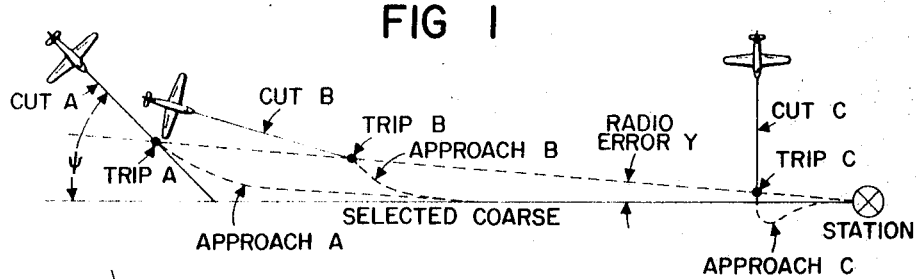
FIGURE 1 is a diagrammatic representation of a particular radio beam capture situation utilizing the fixed radio error threshold capture psychology.

FIGURE 1 illustrates flight situations as may occur with present guidance systems wherein an aircraft is taking cuts at a selected VOR radio course with the capture trip point occurring as the aircraft reaches a position such that radio error (angular error) is at a predetermined threshold at which time control of the aircraft is switched to the track mode and various combinations of radio, radio rate, etc., bring the aircraft on to the selected course in an asymptotic manner. Cut A illustrates a comparitively steep cut resulting in approach A. The objection to this typical beam capture situation is that a considerable time is necessary for the aircraft to actually attain a ground track coincident with the selected VOR course radial.

Cut B illustrates present system operation with a shallow cut being taken at the selected course, such that the radio rate (y) is very small. Present systems in this situation may initially command a turn towards the course followed by an asymptotic approach on to the course. This flight control situation is against pilot instinct since the psychology of the initial turn towards the course seems to be the wrong thing to do to smoothly attain a selected ground track.

Cut C illustrates a further flight situation where a station cut may be taken at the selected course close in to the VOR station. In this case, the trip threshold, in occurring at a predetermined angular error point, occurs at a very small off-course distance, and an overshoot will generally occur before correction and final attainment of the selected course.

The psychology of the present invention is that of eliminating the relatively uncertain attainment of an on-course condition as provided by present systems, by basing aircraft control on a capture logic which effects a trip point where the aircraft heading vector becomes tangent to a circle to which the selected radio course is also tangent.

The radius of the circle is based on the aerodynamic turn radius expression which defines a particular turn radius which may be made good at a particular aircraft velocity and aircraft bank angle. This aerodynamic relationship holds for all aircraft. When one considers a constant bank angle (for example, the maximum desired or permissible bank angle), the turn radius R then varies as a function of the square of the aircraft velocity.

Figure 2:
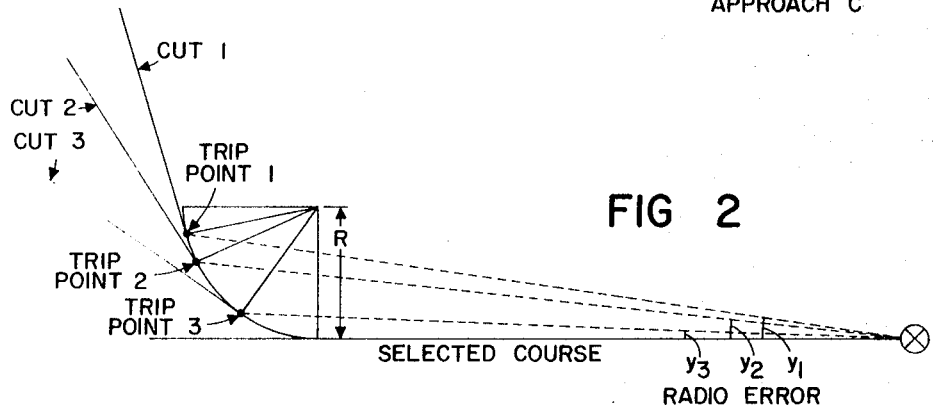
FIGURE 2 is a diagrammatic representation of the radio beam capture situation utilizing features of the present invention.

FIGURE 2 illustrates capture flight situations in accordance with the present invention for a particular turning radius R corresponding to a given aircraft bank angle and velocity. A first cut is seen to effect a capture trip point 1 as the heading vector becomes tangent to the circle of radius R. Capture point 1 is seen to be effected at a radio error signal $y_1$. The selected course is attained over an arcurate path from the tangency point at trip 1 to a point of tangency on the selected course.

FIGURE 2 illustrates further that cuts 2 and 3 at the selected course for progressively smaller course datum angles $\psi$ effect trip points at corresponding points of tangency which represent progressively lesser off-course lateral distances and radio course errors. Thus, in accordance with the present invention the capture point is seen to be a function of the course datum signal $\psi$.

Figure 3:
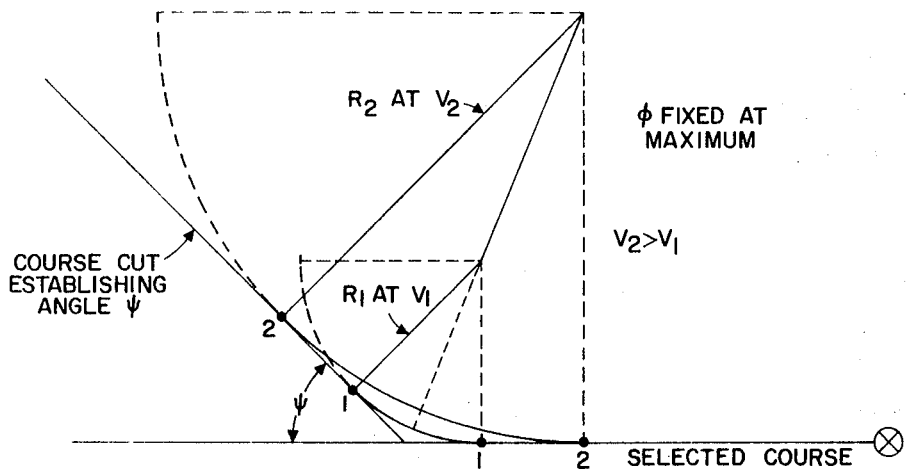
FIGURE 3 is a further diagrammatic representation of the aircraft radio beam capture system utilizing capture of the present invention.

FIGURE 3 further illustrates capture situations in accordance with the present invention by depicting situations with identical course cuts and angle $\psi$, but at different aircraft velocities. The control circle radius increases with aircraft velocity. Thus, situation 1 represents a trip point as the point of tangency between the heading vector and the circle of radius $R_1$ which corresponds to velocity $V_1$, with the aircraft following the arcurate path 1—1 onto the selected course. When the aircraft approaches the selected course at the same angle $\psi$, but at a greater velocity, the capture trip point is effected at the point of tangency between the heading vector and the circle of the radius $R_2$ corresponding to the greater velocity $V_2$, and the aircraft follows the arcurate course 2—2 onto the selected course line. It is seen then that, for any given course cut angle, the capture trip point is effected at a lateral offcourse distance which is a function of the aircraft velocity.

In each of the flight situations depicted in FIGURE 2, it is apparent that the aircraft follows an optimum circular course onto the selected course line. In accordance with the present invention this arcuate course or tangent approach may be made good by causing the aircraft to bank at a predetermined maximum bank angle at the instant the capture trip point is sensed.

The manner in which the above defined velocity may be implemented in accordance with the present invention stems from an analysis of the aerodynamics of the aircraft turns in conjunction with the geometry of the flight situation. From a consideration of these factors, a formula for the ideal trip point as a function of the aircraft velocity, distance from the radio ground station, and the course datum error may be developed as follows:

An aircraft flying at a velocity V and caused to bank at an angle $\phi$ will develop a turn radius in accordance with the following aerodynamic formula:

$$R = \frac{V^2}{g \tan \phi} \quad (1)$$

where $g$ is the acceleration of gravity.

Figure 4:
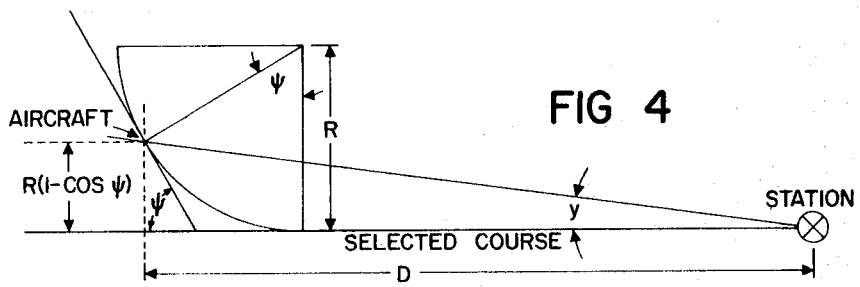
FIGURE 4 is a further diagrammatic representation of the geometry of the capture system afforded by the present invention.

Analysis of the Expression 1 indicates that the turning radius of an aircraft is directly proportional to square of the aircraft velocity and inversely proportional to gravity vector multiplied by the tangent of the bank angle $\phi$. Now referring to the geometry of the capture situation as illustrated in FIGURE 4, the aircraft is illustrated as being at the point of tangency of its heading factor to a given control circle of radius R so as to establish a course datum (heading error) angle $\psi$. The tangency point is indicated as being at a distance D from the ground radio station along the selected course. The angular radio error $y$ is established as the angular offset of the aircraft from the selected course. From inspection of the flight situation of FIGURE 4, the lateral displacement of the aircraft from the selected course may be expressed as follows:

Lateral displacement $= R(1 - \cos \psi)$

With the assumption that the angular radio error is a small angle, the angle $y$ may be expressed as:

$$y = \tan y = \frac{R(1 - \cos \psi)}{D} \quad (2)$$

Substituting the expression R as defined in Equation 1 into the expression for $y$ as defined in Equation 2, we may arrive at the following formula for an ideal trip point as a function of velocity, distance, and course datum angle:

$$y = \frac{V^2(1 - \cos \psi)}{Dg \tan \phi} \quad (3)$$

Equation 3 then defines a trip point occurring when the radio error $y$ equals a quantity expressed in terms of aircraft velocity, course datum angle, bank angle, and distance from the radio station.

A capture trip point based upon Expression 3 is seen to infer numerous variables, and thus, in accordance with the present invention, an examination is made as to how the ideal expression might be approached and simplified in terms of readily available parameters. The closest available parameter to the function expressed in Equation 3 is radio rate. From the geometry of the flight situation of FIGURE 4, radio rate, for small radio error signals $y$ may be expressed as:

$$\dot{y} = \frac{V}{D} \sin \psi \text{ (for small } y\text{)} \quad (4)$$

Expression 4 is seen to include a direct function of velocity, inverse function of distance and a sinusoidal function of the course datum angle $\psi$. Expression 4 may be operated on to arrive at an expression more nearly like the ideal Equation 3.

From trigonometric identities, the following equality may be considered:

$$\tan \frac{\psi}{2} \sin \psi = (1 - \cos \psi)$$

The above states that the sine of an angle multiplied by the tangent of the half angle equals $(1 - \cos \psi)$.

Multiplying Expression 4 by $\tan \psi/2$ gives:

$$\tan \frac{\psi}{2} (\dot{y}) = \frac{V}{D} \sin \psi \tan \frac{\psi}{2}$$

which may be then expressed as:

$$\tan \frac{\psi}{2} (\dot{y}) = \frac{V}{D} (1 - \cos \psi) \quad (5)$$

Now, Expression 5 states that the tangent of half the course datum angle $\psi$ multiplied by the radio rate equals an expression having a form more nearly like that of the idealized Expression 3. It is seen that Expression 5 contains velocity, distance, and the same trigonometric function of the course datum angle $\psi$. Looking further at Equation 3 we are concerned with a fixed bank angle $\phi$. Thus the term $g \tan \phi$ of Expression 3 may be considered a constant.

Further, for values of angle $\psi$ up to 90°, the tangent of the half angle $(\psi/2)$ is nearly a straight line function. Thus, the left hand side of Equation 5 may be expressed as:

$$\text{Tan } \frac{\psi}{2} (\dot{y}) = k|\psi|\dot{y} \quad (6)$$

Now, comparing the idealized expression of Equation 3 with the expression of Equation 6, the capture trip logic, in accordance with the present invention, then becomes that point at which:

$$y = k|\psi|\dot{y} \quad (7)$$

Expression 7 infers a linear function of the angle $\psi$ which may be obtained by shaping the $\psi$ parameter for linearity between values from 0° to 90°, the range under consideration in the present invention.

Figure 5:
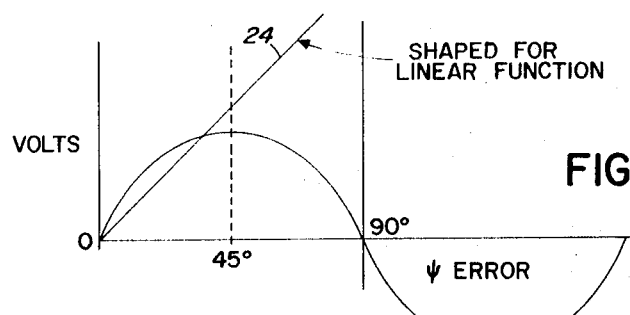
FIGURE 5 is a waveform typifying a course datum synchro output signal as implemented in the present invention.

The course datum signal, as depicted in FIGURE 5 is an output signal from a synchro and thus sinusoidal in form. The signal is depicted as the full wave rectification envelope through the range zero to 90°. The signal is nearly a linear function from zero to 45°, and may be shaped to be a linear function through the desired zero —90° range as indicated by the straight line 24 in FIGURE 5.

In accord with Expression 7, a capture trip point is to be effected when the radio error signal $y$ equals an appropriate constant times the product of absolute value of the heading error signal and radio rate which is equivalent to satisfying the relationship of Expression 8. The actual implementation then becomes a mixing of radio error signal $y$ with a signal equivalent to the absolute value of the heading error multiplied by radio rate with detection of the time at which these expressions are equal.

Expression 7 may be written as:

$$y - k|\psi|\dot{y} = 0 \quad (8)$$

which suggests an implementation involving comparison of radio error $y$ to an expression which is proportional to the product of the absolute value of the course datum angle $\psi$ times radio rate $\dot{y}$.

It is noted that the above described capture trip logic is based very nearly on the idealized aerodynamic-geometric function of Equation 3, with the exception that the trip logic is based on a function of velocity rather than velocity squared. In practice, a given aircraft will approach a selected course at a fairly well predetermined velocity such that the velocity term may be taken care of in the system gain constant for a particular type of aircraft.

Figure 6:
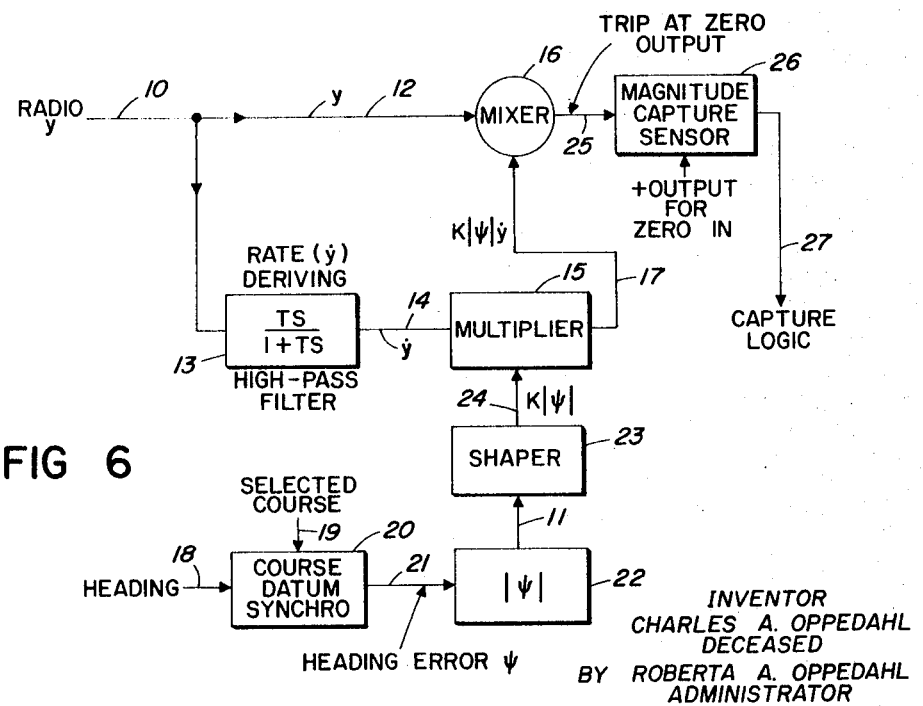
FIGURE 6 is a functional block diagram of an embodiment of the present invention illustrating the development of the capture logic signal in accordance with the present invention.

FIGURE 6 illustrates such an implementation. Inputs to the control system are radio error $y$, aircraft heading and selected course. The radio error signal is applied directly to a mixer 16 and is additionally applied to a rate deriving circuitry to develop a radio rate signal 14. The radio rate signal 14 is applied as a first input to a multiplier 15 the second input 24 to which is the angle $\psi$ under consideration. The course datum signal 21 is applied to a rectifying arrangement which develops the absolute value. The signal 11 proportional to the absolute value of the heading error is then applied to a shaper 23 to attain linearity over the angular range under concern. The output from the shaper 23 is applied to the multiplier 15 and the multiplier develops an output proportional to expression $k|\psi|\dot{y}$ for application to the mixer 16. The trip point is to be effected when the radio error $y$ equals the output from the multiplier Equation 8. Accordingly, the output 25 from the mixer is applied to a threshold sensor 26 which develops a positive output or pulse 27 when the input to the sensor goes to zero $(y-k|\psi|\dot{y}=0)$. The output 27 from the sensor may then be utilized in appropriate capture logic control circuitry.

The radio beam capture as herein described then permits the aircraft to make a maximum bank maneuver so as to track a circular path to which the selected course is tangent.

Figure 7:
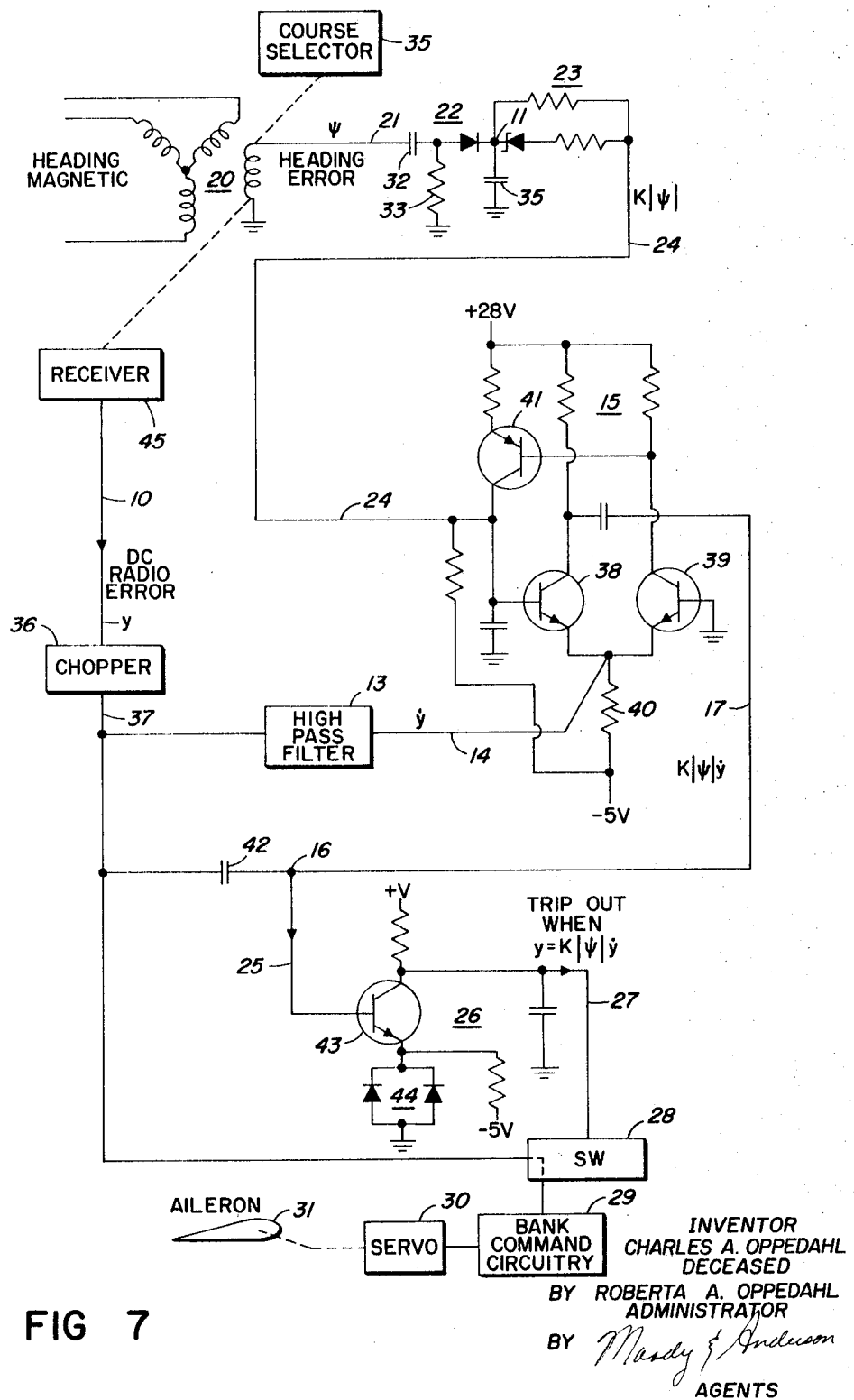
FIGURE 7 is a functional schematic diagram showing a particular implementation as might be employed in the present invention.

A particular manner in which the present invention has been implemented is shown in FIGURE 7. The course datum or heading error signal 21 is developed as the signal induced in the rotor of the course datum synchro 20. The angular position of the rotor of the synchro 20 might be positioned by means of a course select control 35 to set in a selected radio course. This course selection would likewise be made in the radio navigation receiver which develops the radio error signal 10. The stator of synchro 20 is supplied with an electrical signal corresponding to the magnetic heading of the aircraft. Any discrepancy between the selected course as set in by the control 35 and the magnetic heading, develops a heading error signal 21 which is proportional to the course datum heading error angle $\psi$ as illustrated in FIGURE 1. The circuitry 22 of FIGURE 6 is implemented in FIGURE 7 by passing the heading signal 21 through a half-wave rectifying arrangement comprised of capacitor 32 resistor 33, diode 34 and capacitor 35, to develop a D.C. signal the amplitude of which is proportional to the magnitude of the heading error signal. As previously discussed with reference to FIGURE 5, the course datum signal output 21 is sinusoidal in nature, essentially linear between 0° and 45°, and is to be shaped for linearity over the range of from 0° to 90°. Thus, the half way rectification performed by circuit 22 develops a sinusoidal output corresponding to the waveform between 0° and 90° of FIGURE 5 and is accordingly applied to a shaping network 23 such that the function is linearized throughout the 0° to 90° range. Such a shaping may be accomplished by passing the signal through a Zener diode and resistor combination to develop a signal 24 proportional to the absolute value of the angle $\psi$ over the range of from 0° to 90°. The output 24 is applied as a D.C. input to the multiplier 15.

The second input to the multiplier, in accordance with the capture logic expression of Equation 8 is a signal proportional to the rate of change of the radio error signal or $\dot{y}$. Accordingly D.C. radio error signal 10 from receiver 45 is applied to the chopper 36 to develop an A.C. signal 37 proportional the ratio error signal. Signal 37 is applied to a high pass filter 13, to develop an A.C. output 14 proportional to radio rate $(\dot{y})$. The signal 14 is applied as a second input to the multiplier 15.

In the particular implementation of FIGURE 7, multiplier 15 operates to multiply a D.C. input 24 proportional to the absolute value of the heading error signal by an A.C. signal proportional to the radio rate or $\dot{y}$. Thus the D.C. radio signal 10 is first chopped to convert the D.C. error signal with magnitude and polarity sensing to an A.C. signal with magnitude and phase sensing. The invention is not limited to the development of an A.C. radio rate signal and a D.C. course datum signal as depicted in FIGURE 7. The embodiment of FIGURE 7 develops an A.C. radio rate and D.C. course datum signal for application to a particular multiplier circuitry 15 which operates on an A.C. and a D.C. input.

As previously discussed, the multiplier develops an output proportional to $k|\psi|\dot{y}$. The multiplier embodied in FIGURE 7 is of a type as described in co-pending application, Ser. No. 577,444, entitled Analog Multiplier by Melvin Rhodes, assigned to the assignee of the present invention and filed concurrently herewith. Reference is made to the co-pending application for a detailed description of the operation of the multiplier 15. It will be sufficient here to state that the multiplier is comprised of first and second transistors 38 and 39 each connected in a comon base configuration and with a common emitter-resistor 40 to a negative source of voltage. A D.C. feedback arrangement is taken from the collector of the transistor 39 through the base collector junction of a third transistor 41 to the base of input transistor 38. This arrangement is a normally balanced circuitry and the D.C. input signal 24 is applied to the base of the transistor 38 while the A.C. input signal 14 is applied to the common emitter connection between transistor 38 and 39. The output taken from the collector of the transistor 38 is proportional to the product of the inputs 24 and 14. This output product 17 is mixed with the radio signal as applied through capacitor 42 to the junction 16 to provide an A.C. mixing function and develop a signal 25 for application to sensor 26. Zero threshold signal 25 will go to zero when the signal through 42 proportional to the radio error equals the signal 17 proportional to the product of the absolute value of the course datum angle $\psi$ and radio rate $\dot{y}$.

The threshold sensor 26 is embodied as a transistor 43, the emitter of which is returned to ground through diodes 44 and to a negative voltage source. The collector of the transistor 43 is returned through a load resistor to a positive voltage source and the output of the collector serves as the capture logic output 27. Output 27 goes positive when the input 25 goes to zero. In operation, transistor 43 is normally conducting in the presence of an input signal 25. During this period of conduction, the collector voltage of transistor 43 is pulled down. As the input signal level falls to zero, transistor 43 is cut off, and the collector voltage rises to the value of the positive collector voltage supply source. The diode 44 are employed in the circuit to cut down the threshold necessary to hold the transistor in the "off" condition.

The embodiment of FIGURE 7 illustrates functionally the manner in which the capture trip logic output signal 27 might be employed in an aircraft control development circuitry. The output 27 from the sensor 26 might be employed to operate a switch 28 so as to pass the radio signal to a bank command formulation circuitry 29 as an input control parameter. The bank command circuitry 29 might then operate a servo which in turn positions the aircraft ailerons 21 to control the bank attitude of the aircraft in accordance with the radio signal. It is seen that this aileron control by radio error is effected only from the time that the capture threshold is attained, and, in accordance with the present invention, occurs at a point which takes into consideration aircraft velocity and the distance from the radio ground station, as well as the angle at which a cut is being taken at the select radio course. Capture mode is effected at a time such that the aircraft may approach the beam on a circular course at maximum bank angle and roll out onto the selected course line with zero radio error and zero bank command so as to effect a positive capture of the radio course line. Although a very generalized utilization of the capture trip logic circuitry 27 is illustrated in the embodiment of FIGURE 3, it is to be realized that, in practice, considerably more sophisticated use may be made of this capture signal as a logic signal in conjunction with other control parameters. A more sophisticated arrangement, for example, might employ the use of the logic signal to effect a mixing of the radio heading error signals at the time of capture and incorporate specific gain changes in certain control parameter developing circuitry as is appropriate to the flight situation.

Although this invention has been described with respect to a particular embodiment is not to be so limited as changes and modifications may be made therein which are within the spirit and scope of the invention as defined in the appended claims

What is claimed is:

1. In an aircraft control system of the type including means for controlling the heading of an aircraft in response to an error signal proportional to the angular displacement of the aircraft with respect to a selected radio defined course line, means for developing a control signal upon said radio error signal reaching a value equaling a predetermined function of the velocity of said aircraft, the distance between the aircraft and the source of said radio defined course, and the angle between the heading vector of said aircraft and said radio defined course line; said means comprising first signal developing means for producing a first course datum signal proportional to the absolute value of the angle between said aircraft heading vector and said radio defined course line, second signal developing means for producing a second signal proportional to the rate of change of said radio error signal, signal multiplying means receiving said first and second signals and developing an output proportional to the product thereof, signal comparison means receiving said radio error signal and the output product from said multiplying means, threshold monitoring means receiving the output from said comparison means and developing an output signal upon the input thereto becoming zero, and control means responsive to said output signal whereby said aircraft is caused to follow a segment of a circular path between respective points of tangency of said heading vector and said selected radio defined course vector, the radius of said circular path being defined as $$\frac{V^2}{g \tan \phi}$$

when V is aircraft velocity, g is the gravity vector, and $\phi$ is a predetermined aircraft bank limit angle.

2. A control system as defined in claim 1 wherein said second signal developing means comprises filtering means including a high pass filter to which said radio error signal is applied and which develops a signal proportional to the rate of change of said radio error signal.

3. A control system as defined in claim 1 wherein said first signal development means comprises means for developing a D.C. voltage proportional to the amplitude of said course datum signal and signal shaping means receiving said D.C. voltage and linearizing said D.C. voltage as a function over a range of said course datum signals from zero to ninety degrees.

4. A control system as defined in claim 1 wherein said second signal developing means comprises filtering means including a high pass filter to which said radio error signal is applied and which develops a signal proportional to the rate of change of said radio error signal, said first signal development means comprises means for developing a D.C. voltage proportional to the amplitude of said course datum signal and signal shaping means receiving said D.C. voltage and linearizing said D.C. voltage over a range of said course datum signal from zero to ninety degrees.

5. A control system as defined in claim 4 wherein said course datum signal is the signal developed in a course datum synchro the stator of which is energized with a three wire A-C signal definitive of the magnetic heading of said aircraft, the angular position between the rotor of said synchro and the stator thereof corresponding to the selected radio course, and said first signal development means comprising signal rectifying and filtering means to develop a D.C. signal the amplitude of which corresponds to the envelope of said synchro rotor signal, said signal shaping means comprising a Zener diode and resistor network whereby said amplitude envelope is modified from a sinusoidal function to a linearly increasing function over a range of course datum angles between zero and ninety degrees.

6. Means causing an aircraft to approach and follow a ground track defined by a selected radio defined course line on a path defined as the arc of a circle of radius R between respective points of tangency of the approach vector and the radio defined course to said circle, where the radius R is defined as being proportional to $$\frac{V^2}{g \tan \phi}$$

where V is the aircraft velocity, g the gravity vector and $\phi$ a predetermined bank angle of said aircraft, said means comprising signal comparison means receiving a first signal proportional to the angular error between the position of said aircraft and the elected course line and a second signal proportional to the product of the rate of change of said first signal and a further signal proportional to the absolute value of the angular discrepancy between the approach vector of said aircraft to said radio course and said radio course line, monitoring means receiving an input from signal comparison means and developing an output signal when said aforedefined signal comparison equals zero, and control means responsive to said output signal to initiate a maximum bank maneuver of said aircraft.

References Cited

UNITED STATES PATENTS 2,932,023   4/1960   Haskins _____ 343—107
3,099,007   7/1963   Kittrell _____ 343—107

FERGUS S. MIDDLETON, *Primary Examiner.*